(12) United States Patent
Cao et al.

(10) Patent No.: US 8,604,721 B2
(45) Date of Patent: Dec. 10, 2013

(54) LAMP TUBE SWITCHING CIRCUIT

(75) Inventors: Qing-Shan Cao, Shenzhen (CN); Zheng-Nian Liu, Shenzhen (CN); Nan Zeng, Shenzhen (CN); Miao-Ping Guo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 312 days.

(21) Appl. No.: 13/215,213

(22) Filed: Aug. 22, 2011

(65) Prior Publication Data

US 2013/0002152 A1    Jan. 3, 2013

(30) Foreign Application Priority Data

Jun. 28, 2011  (CN) .......................... 2011 1 0176616

(51) Int. Cl.
*H05B 37/02*  (2006.01)

(52) U.S. Cl.
USPC ............ 315/362; 315/378; 307/112; 307/115

(58) Field of Classification Search
USPC .................... 307/112, 113, 115; 315/178, 362
See application file for complete search history.

(56) References Cited

U.S. PATENT DOCUMENTS

| | | | |
|---|---|---|---|
| 3,828,221 A * | 8/1974 | Spiteri | 315/161 |
| 4,484,109 A * | 11/1984 | Buser | 315/290 |
| 8,459,829 B2 * | 6/2013 | Cao et al. | 362/217.14 |
| 2010/0283328 A1 * | 11/2010 | Eggert | 307/112 |

FOREIGN PATENT DOCUMENTS

JP   2003229003 A   8/2003

* cited by examiner

*Primary Examiner* — Thuy Vinh Tran
(74) *Attorney, Agent, or Firm* — Altis Law Group, Inc.

(57) ABSTRACT

A lamp tube switching circuit includes a first connector and a second connector for connecting either an LED lamp tube or a fluorescent type lamp tube, a switch module being a mechanical switch including first, second and third switches, a starter and ballast. Each of the first and second switches has a static terminal for connecting with a power supply, and four dynamic terminals for selectively connecting with the static terminal thereof. Different circuits can be configured by adjusting the connection between the static and dynamic terminals, wherein each circuit can drive a selected type of lamp tube to generate light.

5 Claims, 3 Drawing Sheets

| Type number | Schematic | 3a-1 | 3a-2 | 3a-3 | 3a-4 | 3b-1 | 3b-2 | 3b-3 | 3b-4 | 3c-1 | 3c-2 | 3c-3 | 3c-4 |
|---|---|---|---|---|---|---|---|---|---|---|---|---|---|
| 1 | LED light | 1 | 0 | 0 | 0 | 1 | 0 | 0 | 0 | 0 | 0 | 0 | 0 |
| 2 | LED light | 0 | 0 | 1 | 0 | 0 | 0 | 1 | 0 | 0 | 0 | 0 | 0 |
| 3 | LED light | 0 | 0 | 0 | 1 | 0 | 0 | 0 | 1 | 0 | 0 | 0 | 0 |
| 4 | LED light | 0 | 0 | 1 | 0 | 0 | 0 | 1 | 0 | 0 | 0 | 0 | 0 |
| 5 | LED light | 1 | 0 | 0 | 0 | 1 | 0 | 0 | 0 | 0 | 0 | 0 | 0 |
| 6 | Fluorescent | 0 | 1 | 0 | 0 | 0 | 1 | 0 | 0 | 0 | 1 | 0 | 0 |

FIG. 2

LAMP TUBE SWITCHING CIRCUIT

CROSS-REFERENCE TO RELATED APPLICATIONS

Related subject matter is disclosed in co-pending U.S. patents application with an Ser. No. 13/215,208 and a title of LAMP TUBE SWITCHING CIRCUIT, and an Ser. No. 13/215,210 and a title of LAMP TUBE SWITCHING CIRCUIT AND METHOD THEREOF, which have the same assignees as the current application and were concurrently filed.

BACKGROUND

1. Technical Field

The present disclosure relates to switching circuits and, particularly, to a switching circuit for different types of lamp tubes.

2. Description of the Related Art

LEDs are widely used due to their advantageous characteristics. However, conventional lamp holders, for example fluorescent lamp holders, cannot be used to hold LED lamps, and also, LED lamp holders cannot be used to hold fluorescent lamps. Therefore, if users want to replace a fluorescent lamp with an LED lamp or replace an LED lamp with a fluorescent, they have to replace the holders as well.

Therefore, there is room for improvement within the art.

BRIEF DESCRIPTION OF THE DRAWINGS

The components in the drawings are not necessarily drawn to scale, the emphasis instead being placed upon clearly illustrating the principles of a lamp tube switching circuit. Moreover, in the drawings, like reference numerals designate corresponding parts throughout the several views.

FIG. 2 is a state diagram of a switch module when different types of lamp tubes are connected to the lamp tube switching circuit of FIG. 1.

DETAILED DESCRIPTION

Figure 1:
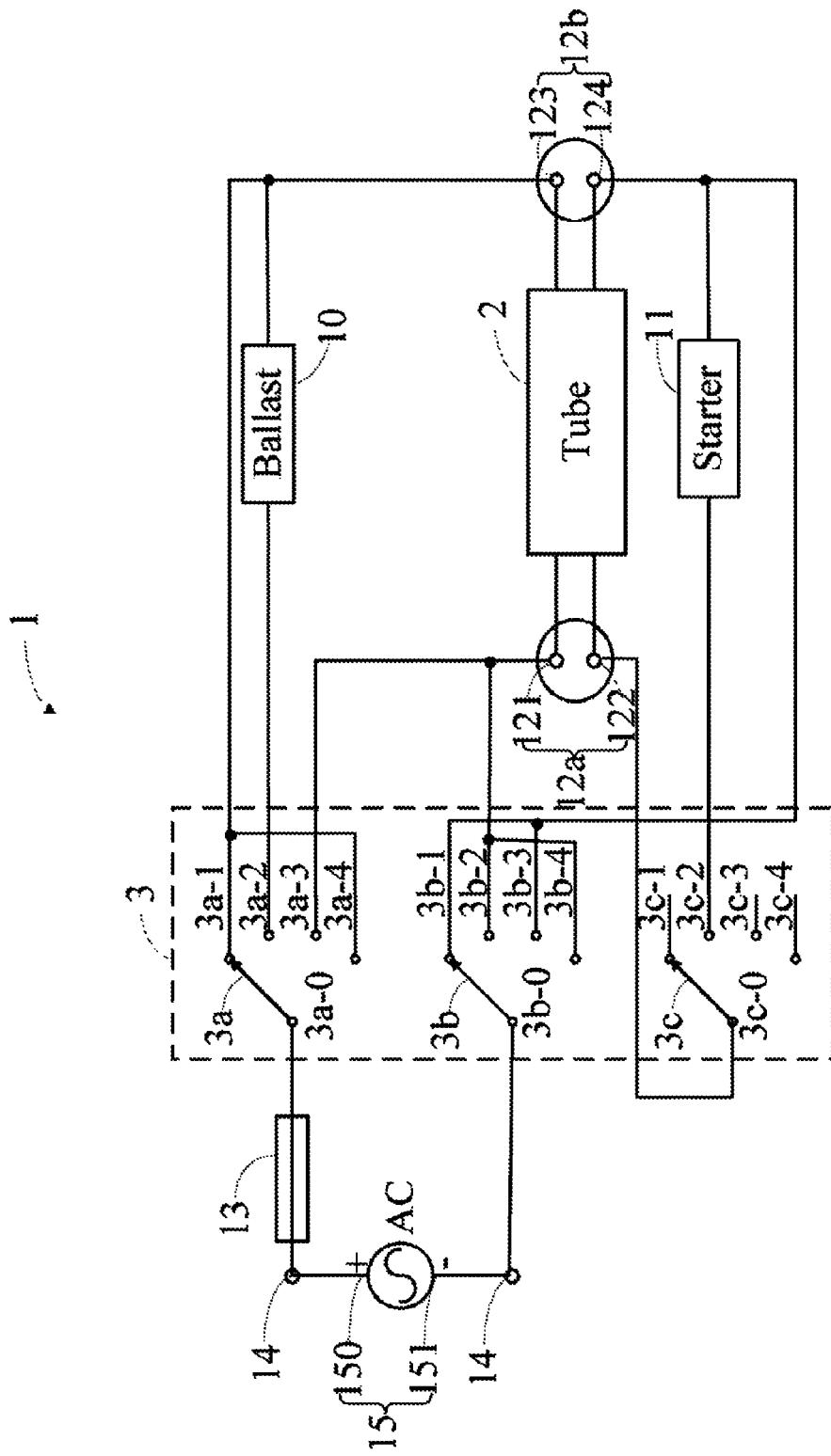
FIG. 1 is a circuit diagram of a lamp tube switching circuit in accordance with an exemplary embodiment.

Referring to FIG. 1, a lamp tube switching circuit 1 includes a ballast 10, a starter 11, a first connector 12a and a second connector 12b for connecting a lamp tube 2, and a power port 14 for connecting a power supply 15. The circuit 1 further includes a switch module 3, connected between the power port 14, the first connector 12a and the second connector 12b. The ballast 10 and the starter 11 are connected between the switch module 13 and the second connector 12b. The switch module 3 includes at least two switches 3a and 3b. A user may switch each of the at least two switches 3a and 3b between "on" and "off", to form a plurality of combinations of the states of the at least two switches 3a and 3b for driving circuits correspondingly to the LED type lamp tube and the fluorescent type lamp tube. The plurality of combinations may be marked up on a surface of an electronic device equipped with the switching circuit 1 for users to operate the switch module 3. Users can operate the switch module 3 to turn on several of the at least two switches 3a and 3b and turn off the remaining to form a combination of the states of the at least two switches 3a and 3b according to the type of the lamp tube selected, to form a drive circuit corresponding to the type of the lamp tube 2.

In the embodiment, the switch module 3 includes switches 3a, 3b, and 3c, and each of the switches 3a, 3b and 3c includes a static terminal and four dynamic terminals. The switch module 3 may be a mechanical switch module. The first connector 12a includes a first port 121 and a second port 122, the second connector 12b includes a third port 123 and a fourth port 124.

The static terminal 3a-0 of the switch 3a is connected to the positive terminal 150 of the power supply 15, the static terminal 3b-0 of the switch 3b is connected to the negative terminal 151 of the power supply 15, and the static terminal 3c-0 of the switch 3c is connected to the second port 122.

A dynamic terminal 3a-2 of the switch 3a is connected to a first terminal of the ballast 10, and a second terminal of the ballast 10 and dynamic terminals 3a-1 and 3a-4 of the switch 3a are connected to the third port 123. The dynamic terminals 3b-1 and 3b-3 of the switch 3b and a second terminal of the starter 11 are connected to the fourth port 124. The dynamic terminals 3b-2 and 3b-4 of the switch 3b and the dynamic terminal 3a-3 of the switch 3a are connected to the first port 121. A first terminal of the starter 11 is connected to the dynamic terminal 3c-2 of the switch 3c.

FIG. 2 illustrates a state diagram of the switch module 3 when different types of lamp tubes 2 are connected to the circuit 1. In this diagram, "1" is defined to be the "on" state of the at least two switches, and "0" is defined to be the "off" state of the at least two switches. Taking a first type of lamp tube as an example which is an LED lamp tube, and the first type of the lamp tube includes two conductive pins mounted on an end of the lamp tube, and two insulation pins mounted on the other end of the lamp tube. "NC" corresponds to the insulation pin. When a lamp tube of the first type is needed to be connected to the circuit 1, users operate the dynamic terminal 3a-1 to connect to the static terminal 3a-0, and operate the dynamic terminal 3b-1 to connect to the static terminal 3b-0, and turn off the other dynamic terminals of the switches 3a and 3b and turn off the switch 3c, to form a combination of the switches 3a, 3b and 3c which is appropriate for the first type of lamp tube. Thus, when the lamp tube of the first type is connected to the circuit 1, the two conductive pins are connected to the positive terminal 150 and the negative terminal 151 of the power supply 15 via the third port 123 and the fourth port 124 respectively, and the two insulation pins are connected to the first port 121 and the second port 122. Thus, the drive circuit corresponding to the first type of lamp tube 2 is formed, and the lamp tube 2 can be driven to light. When any one of the second, third, fourth, and fifth type of lamp tube is needed to be connected in the switching circuit 1, the operation is the same as the above description.

Taking a sixth type tube, namely a fluorescent tube, as an example, two conductive pins are mounted on each end of the fluorescent tube. When the fluorescent tube is connected to the circuit 1, users operate the dynamic terminal 3a-2 to connect to the static terminal 3a-0, and operate the dynamic terminal 3b-2 to connect to the static terminal 3b-0, and operate the dynamic terminal 3c-2 to connect to the static terminal 3c-0, and turn off the other dynamic terminals of the three switches 30a, 30b, 30c. Thus, when the fluorescent tube is connected to the switching circuit 1, the conductive pin connected to the first port 121 is connected to the negative terminal 151 of the power supply 15, and the conductive pin connected to the second port 122 is connected to the positive terminal 150 of the power supply 15. The conductive pins connected to the third port 123 and the fourth port 124 are connected between the ballast 11 and the starter 11. Thus, a drive circuit corresponding to a fluorescent tube is formed, and the fluorescent tube can be driven to light.

In the embodiment, the switching circuit 1 further includes a fuse 13 connected between the positive terminal 150 of the power supply 15 and the switch module 3, preventing damage to the circuit 1 from short circuits.

Figure 3:
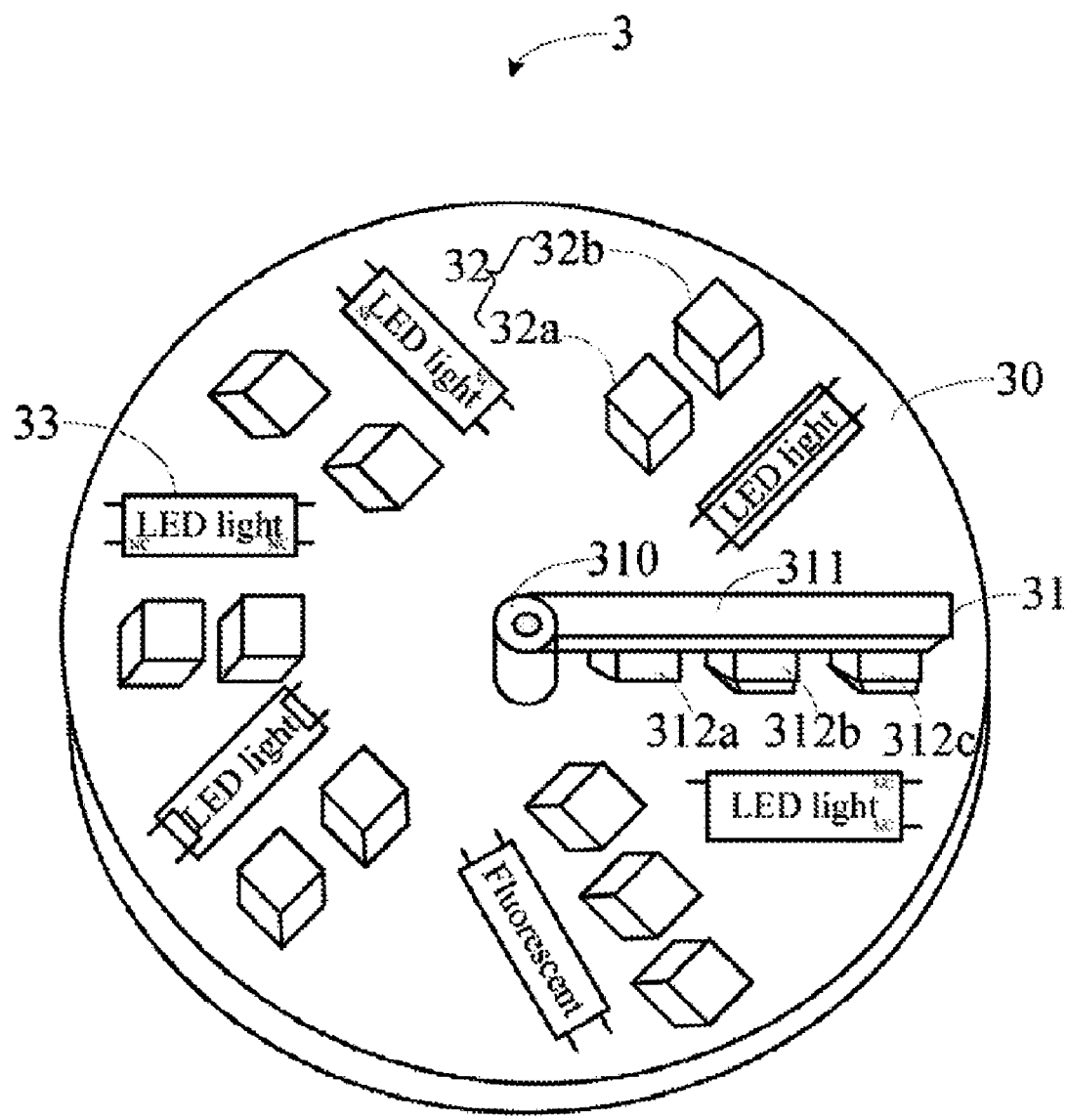
FIG. 3 is a schematic view of the switch module of FIG. 1.

FIG. 3 illustrates a schematic view of the switch module 3. The switch module 3 includes a main body 30, a sliding member 31, and a number of contact modules 32 all arranged on a top surface of the main body 30. The main body 30 is substantially disc-shaped. The sliding member 31 includes an axial post 310 and a moveable arm 311 with one end rotatably connected to the axial post 310. The axial post 310 is secured to the centre of the surface of the main body 30. The moveable arm 311 is suspended above the surface of the main body 30. Three conductive protrusions 312a, 312b, and 312c protrude from the bottom surface of the moveable arm 311 and look down on the surface of the main body 30. The protrusion 312a, 312b, and 312c are connected to the positive terminal 150, the negative terminal 151 and the first connector 12a, respectively. In the embodiment, the protrusion 312a is connected to the positive terminal 150, the protrusion 312b is connected to the negative terminal 151, and the protrusion 312c is connected to the second port 122.

The contact modules 32 are disposed on the top surface of the main body 30, and each contact module 32 includes at least two contact elements arranged radially along the main body 30. The contact elements of each contact module 32 are respectively connected to the dynamic terminals of the switches 3a, 3b, and 3c. The at least two contact elements are connected to the protrusions 312a, 312b, and 312c, to form a drive circuit correspondingly to the selected lamp tube of the LED type lamp tubes and the fluorescent type lamp tube when the conductive protrusions 312a, 312b, 312c of the moveable arm 311 make contact with the at least two contact elements. In this embodiment, there are six contact modules 32, where each of five contact modules 32 includes two contact elements used for creating a drive circuit suitable for one of the LED lamp tubes, and the remaining one contact module 32 includes three contact elements used for creating a drive circuit suitable for a fluorescent tube. In the embodiment, an icon 33 is positioned next to each of the contact modules 32 for indicating the function of each contact module 32 in respect to the LED type lamp tubes or the fluorescent type lamp tube.

Taking the first type of lamp tube as an example, the contact module 32 corresponding to the first type of lamp tube includes two contact elements 32a and 32b, and the contact element 32a is connected to the dynamic terminal 3a-1, and the contact element 32b is connected to the dynamic terminal 3b-1. When the moveable arm 310 makes contact with the contact module 32, the protrusions 312a and 312b formed on the moveable arm 312 connect to the contact elements 32a and 32b respectively, and thereby the dynamic terminal 3a-1 is connected to the static terminal 3a-0, and the dynamic terminal 3b-1 is connected to the static terminal 3b-0. Thus, when a lamp tube 2 of the first type is connected to the circuit 1, the two conductive pins are connected to the positive terminal 150 and the negative terminal 151 of the power supply 15 via the third port 123 and the fourth port 124 respectively, and the two insulation pins are connected to the first port 121 and the second port 122.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A lamp tube switch circuit for providing power to a lamp tube selected from one of different type of lamp tubes including at least a light emitting diode (LED) lamp tube and a fluorescent lamp tube, the switch circuit comprising:

a first connector comprising first and second ports and a second connector comprising third and fourth ports, wherein the first and second ports are for connecting two pins on an end of the lamp tube and the third and fourth ports are for connecting another two pins on an opposite end of the lamp tube;

a power supply having a positive terminal and a negative terminal;

a switch module comprising first, second and third switches, each of the first and second switches having a static terminal and first, second third and fourth dynamic terminals for selectively connecting with the static terminal thereof, the third switch having a static terminal and at least one dynamic terminal for connecting with the static terminal of the third switch, the static terminals of the first and second switches being respectively connected to the positive and negative terminals of the power supply, the static terminal of the third switch being connected to the second port;

a ballast having a first end connected to the second dynamic terminal of the first switch and a second end connected to the first and fourth dynamic terminals of the first switch and the third port; and a starter having a first end connected to the at least one dynamic terminal of the third switch and a second end connected to the fourth port and the first and third dynamic terminals of the of the second switch, the third dynamic terminal of the first switch and the second and fourth dynamic terminals of the second switch connecting with the first port.

2. The switching circuit as recited in claim 1, further comprising a fuse connected between the positive terminal of the power supply and the static terminal of the first switch of the switch module, configured for preventing the switching circuit from short cut.

3. The switching circuit as recited in claim 1, wherein the switch module comprises a main body, a sliding member rotatably mounted on the main body and six contact modules, the sliding member having three conductive protrusions respectively connecting with the static terminals of the first, second and third switches, the sliding member being rotated to have the conductive protrusions contact with a selected one of the six contact modules to enable the power source to supply power to the lamp tube so that the lamp tube can generate light.

4. The switch circuit as recited in claim 3, wherein the main body has an icon positioned next to each of the contact modules for indicating a function of each contact module corresponding to one of the different type of lamp tubes.

5. The switch circuit as recited in claim 1, wherein when the lamp tube is an LED lamp tube with two conductive pins as the two pins on the end of the lamp tube and two insulation pins as the another two pins on the opposite end of the lamp tube, the two conductive pins are connected to the third and fourth ports and the two insulation pins are connected to the first and second ports, and the static terminal of the first switch is connected with the first dynamic terminal thereof, the static terminal of the second switch is connected with the first dynamic terminal thereof, and the static terminal of the third switch is disconnected from the at least one dynamic terminal thereof.

* * * * *